United States Patent
Kautz et al.

(10) Patent No.: US 8,816,011 B2
(45) Date of Patent: Aug. 26, 2014

(54) PROCESS FOR PREPARING AB DIBLOCK COPOLYMERS WITH A BROADLY DISTRIBUTED A BLOCK

(75) Inventors: Holger Kautz, Haltern am See (DE); Sven Balk, Frankfurt (DE); Stephan Fengler, Frankfurt (DE); Dorothea Staschik, Nidderau (DE); Christine Miess, Kahl (DE); Lars Zander, Rommerskirchen (DE); Jens Lueckert, Barsinghausen (DE); Johann Klein, Duesseldorf (DE); Thomas Moeller, Duesseldorf (DE); Volker Erb, Duesseldorf (DE)

(73) Assignees: Evonik Röhm GmbH, Darmstadt (DE); Henkel AG & Co. KGAA, Düsseldorf (DE)

( * ) Notice: Subject to any disclaimer, the term of this patent is extended or adjusted under 35 U.S.C. 154(b) by 632 days.

(21) Appl. No.: 13/128,957

(22) PCT Filed: Oct. 6, 2009

(86) PCT No.: PCT/EP2009/062932
§ 371 (c)(1),
(2), (4) Date: Jul. 21, 2011

(87) PCT Pub. No.: WO2010/054897
PCT Pub. Date: May 20, 2010

(65) Prior Publication Data
US 2011/0281999 A1    Nov. 17, 2011

(30) Foreign Application Priority Data

Nov. 12, 2008   (DE) .................... 10 2008 043 658

(51) Int. Cl.
*C08F 293/00* (2006.01)
*C08F 2/06* (2006.01)
*C08F 2/38* (2006.01)

(52) U.S. Cl.
USPC ........... 525/299; 525/242; 525/244; 525/245; 525/301; 525/302

(58) Field of Classification Search
USPC ......... 525/242, 244, 245, 288, 298, 299, 301, 525/302
See application file for complete search history.

(56) References Cited

U.S. PATENT DOCUMENTS

| 6,143,848 | A  | 11/2000 | Lee et al. |
| 6,784,256 | B1 | 8/2004  | Lee et al. |
| 7,868,098 | B2 | 1/2011  | Loehden et al. |
| 2007/0117948 | A1 | 5/2007  | Loehden et al. |
| 2009/0062508 | A1 | 3/2009  | Balk et al. |
| 2009/0275707 | A1 | 11/2009 | Balk et al. |
| 2009/0312498 | A1 | 12/2009 | Balk et al. |
| 2009/0326163 | A1 | 12/2009 | Balk et al. |
| 2010/0041852 | A1 | 2/2010  | Balk et al. |
| 2010/0280182 | A1 | 11/2010 | Balk et al. |

FOREIGN PATENT DOCUMENTS

| EP | 1 637 550 | 3/2006 |
| WO | 99 20659 | 4/1999 |
| WO | 2007 033887 | 3/2007 |
| WO | 2008 012116 | 1/2008 |

OTHER PUBLICATIONS

Zhang, Z.-B. et al. Polymer vol. 40 (1999) pp. 5439-5444.*
Ruzette, A.-V., et al., "Molecular Disorder and Mesoscopic Order in Polydisperse Acrylic Block Copolymers Prepared by Controlled Radical Polymerization," Macromolecules, vol. 39, pp. 5804-5814, (Jul. 22, 2006) XP 002556195.
International Search Report issued Jan. 19, 2010 in PCT/EP09/062932 filed Oct. 6, 2009.
U.S. Appl. No. 13/125,177, filed Apr. 20, 2011, Kautz, et al.
U.S. Appl. No. 13/127,533, filed May 4, 2011, Balk, et al.
U.S. Appl. No. 13/127,534, filed May 4, 2011, Balk, et al.
U.S. Appl. No. 13/128,777, filed May 11, 2011, Balk, et al.
U.S. Appl. No. 13/127,159, filed May 2, 2011, Balk, et al.

* cited by examiner

*Primary Examiner* — Irina S Zernel
*Assistant Examiner* — Jeffrey Lenihan
(74) *Attorney, Agent, or Firm* — Oblon, Spivak, McClelland, Maier & Neustadt, L.L.P.

(57) ABSTRACT

The invention relates to a controlled polymerization process for preparing (meth)acrylate-based AB diblock copolymers with a B block which has a narrow monomodal molecular weight distribution, and an A block which has a broad monomodal molecular weight distribution, and to the use thereof, for example, as a binder in adhesives or sealants.

19 Claims, No Drawings

PROCESS FOR PREPARING AB DIBLOCK COPOLYMERS WITH A BROADLY DISTRIBUTED A BLOCK

CROSS-REFERENCE TO RELATED APPLICATION

This application is a 371 of PCT/EP2009/062932, filed on Oct. 6, 2009, and claims priority to German Patent Application No. 10 2008 043 658.5, filed on Nov. 12, 2008.

The invention relates to a controlled polymerization process for preparing (meth)acrylate-based AB diblock copolymers having a B block which has a narrow, monomodal molecular weight distribution and an A block which has a broad, monomodal molecular weight distribution, and also to the use thereof, for example as binders in adhesives or sealants.

Tailor-made copolymers with defined composition, chain length, molar mass distribution, etc. are a broad field of research. One of the distinctions made is between gradient polymers and block copolymers. A variety of applications are conceivable for such materials. A number of them will be briefly presented below. Polymers may be prepared, for example, by way of ionic polymerization processes or by polycondensation or polyaddition. In these processes, the preparation of endgroup-functionalized products presents no problems. What does present a problem, however, is a targeted increase in molecular weight.

Polymers obtained through a free-radical polymerization process exhibit molecularity indices of well above 1.8. With a molecular weight distribution of this kind, therefore, there are automatically very short-chain polymers and also long-chain polymers present in the product as a whole. In a melt or in solution, the short-chain polymer chains exhibit a reduced viscosity, while in a polymer matrix they exhibit an increased mobility as compared with long-chain constituents. This has the twin effects first of improved processing properties for such polymers and second of an increased availability of polymer-bonded functional groups in a polymer composition or coating.

Long-chain by-products, in contrast, result in a more-than-proportionate increase in the viscosity of the polymer melt or solution. In addition, the migration of such polymers in a matrix is significantly reduced.

A disadvantage of free-radically prepared binders of this kind, however, is a statistical distribution of functional groups in the polymer chain. Moreover, using a free-radical polymerization method, there is no possibility either of a hard/soft/hard triblock architecture nor of the targeted synthesis of individual polymer blocks having narrow molecular weight distributions.

Block polymers having a sharp transition between the monomers in the polymer chain that is defined as a boundary between the individual blocks. One customary synthesis process for AB block polymers is the controlled polymerization of monomer A and, at a later point in time, the addition of monomer B. Besides sequential polymerization through batchwise addition to the reaction vessel, a similar result can also be achieved by sharply altering the compositions of the two monomers, when they are added continuously, at particular points in time. Suitable living or controlled polymerization methods include not only anionic polymerization or group-transfer polymerization but also modern methods of controlled radical polymerization such as, for example, RAFT polymerization.

The ATRP method (atom transfer radical polymerization) was developed in the 1990s significantly by Prof. Matyjaszewski (Matyjaszewski et al., J. Am. Chem. Soc., 1995, 117, p. 5614; WO 97/18247; Science, 1996, 272, p. 866). ATRP yields narrowly distributed (homo)polymers in the molar mass range of $M_n$=10 000-120 000 g/mol. A particular advantage here is that the molecular weight can be regulated. As a living polymerization, furthermore, it allows the targeted construction of polymer architectures such as, for example, random copolymers or else block copolymer structures. Controlled-growth free-radical methods are also suitable particularly for the targeted functionalization of vinyl polymers. Particular interest attaches to functionalizations on the chain ends (referred to as telechelics) or in the vicinity of the chain ends. In contrast, targeted functionalization at the chain end is virtually impossible in the case of radical polymerization.

Binders with a defined polymer design can be made available through a controlled polymerization method, in the form of atom transfer radical polymerization, for example. For instance, ABA triblock copolymers have been described that possess an unfunctionalized B block and functionalized outer A blocks. Polymers of this kind are described in EP 1 475 397 with OH groups, in WO 2007/033887 with olefinic groups, in WO 2008/012116 with amine groups, and in the as yet unpublished DE 102008002016 with silyl groups. All of the polymers described in these specifications, however, have an explicitly narrow molecular weight distribution. Via the so-called controlled polymerization processes, there have been no processes described that would enable polymers to be prepared having individual blocks or a plurality of blocks with a targetedly broad molecular weight distribution.

One method already established is that of end group functionalization of a poly(meth)acrylate with olefinic groups and the subsequent hydrosilylation of these groups. Processes of this kind are found in EP 1 024 153, EP 1 085 027, and EP 1 153 942, as well as others. The products in these specifications, however, are not block copolymers, and there is explicit reference to a molecular weight distribution of less than 1.6 for the product. A further disadvantage of these products as compared with polymers having multiply functionalized outer blocks is the higher probability of obtaining products which at one end are not functionalized. As a result of the lower degree of functionalization that results in each case as compared with the polymers of the invention, the result for further, downstream reactions, such as, for example, in the curing of sealant formulations, is a lower degree of crosslinking, and this runs counter to mechanical stability and chemical resistance.

Besides telechelics and block structures, an alternative is also represented by ATRP-synthesized—e.g., silyl-containing—(meth)acrylate copolymers having a statistical distribution and a narrow molecular weight distribution. A disadvantage of such binders is a close-knit crosslinking. Owing to the narrow molecular weight distribution, as well, binder systems of this kind have the advantages neither of particularly long or particularly short polymer chains present in the system.

Besides ATRP, other methods too are employed for the synthesis of functionalized polymer architectures. A further relevant method will be briefly described below. It is delimited from the present invention in terms both of the products and of the methodology. The advantages of ATRP over other processes are emphasized in particular:

In anionic polymerization, bimodalities may occur. These polymerization processes, however, are able to generate only certain functionalizations. For ATRP, bimodal distributions have been described for systems. The bimodality of these polymers, however, is a product in each case, first, of the presence of block copolymers and, second, of the presence of unreacted macroinitiators. A disadvantage of these processes is that the product is composed of a mixture of two different polymer compositions.

Problem

A new stage in the development are the diblock copolymers described below.

The problem addressed was that of providing a process for the synthesis of diblock polymers of the structure AB from functionalized poly(meth)acrylates. These polymers are to be composed of B blocks with an inherently narrow molecular weight distribution of less than 1.6 and A blocks which have a monomodal, broad molecular weight distribution with not only long polymer chains but also particularly short polymer chains. There is a requirement in particular for AB diblock copolymers whose B blocks, with a monomodal, broad molecular weight distribution, have a polydispersity index of at least 1.8, and for AB diblock copolymers comprising these A blocks having an overall polydispersity index of at least 1.8.

A further problem was that of providing AB diblock copolymers such that these polymers had different functional groups only in the A blocks or only in the B blocks or in both blocks, or identical functional groups in both blocks. This invention provides more particularly a process for the targeted functionalization of one or both blocks through the incorporation of suitable unsaturated monomers which have an additional functional group during the respective stage of a sequential polymerization.

A further problem addressed by the present invention, therefore, among others, is to provide a binder for adhesives and sealants that has a block structure, is functionalized in a targeted way only in one of the blocks, and comprises short, viscosity-lowering chains at the same time as long, adhesion-promoting chains.

Solution

The problem has been solved by the provision of a new polymerization process which is based on atom transfer radical polymerization (ATRP). The problem has been solved more particularly through initiation over a relatively long time period, more precisely by the metering of the initiator.

A process is provided for preparing block copolymers which is characterized in that it is a sequentially implemented atom transfer radical polymerization (ATRP) where a monofunctional initiator is added to the polymerization solution and in that the block copolymer as a whole and also the block type B has a molecular weight distribution having a polydispersity index of greater than 1.8. The initiation is commenced with one portion of the initiator, and thereafter a second amount of the initiator is metered in continuously.

The block copolymers are prepared by means of a sequential polymerization process. This means that the monomer mixture for the synthesis of the blocks B, for example, is added to the system after a polymerization time $t_2$ only when the monomer mixture for the synthesis of block A, for example, has already undergone at least 90% reaction, preferably at least 95% reaction. This process ensures that the A blocks are free from monomers of the composition B, and that the B blocks contain less than 10%, preferably less than 5%, of the total amount of the monomers of the composition A. According to this definition, the block boundaries are located at the point in the chain at which the first repeating unit of the added monomer mixture—in this example, of the mixture B—is located. A conversion of only 95% has the advantage that the remaining monomers, especially in the case of acrylates, allow a more efficient transition to the polymerization of a second monomer composition, especially of methacrylates. In this way, the yield of block copolymers is significantly improved.

In the process of the invention, only part of the initiator for the polymerization of the monomer mixture A is included in the initial charge, for initiation, and the remainder is metered into the polymer solution over a relatively long time period. With the first batch, the polymerization is initiated. The first initiator charge makes up 10% to 60%, preferably 20% to 40%, of the overall initiator amount. The metered addition of the remaining initiator amount is commenced immediately or, with a slight time stagger, after the onset of an exotherm, but no later than after 10 minutes. Metering takes place over a time period $t_1$ which may vary according to the target molecular weight. The time $t_1$ may be between 60 minutes and 6 hours, preferably between 90 minutes and 3 hours. When metering is at an end, polymerization is continued for the polymerization time $t_2$ before the second monomer mixture A or C is added. As an example, for a target molecular weight of 10 000 g/mol to 40 000 g/mol, $t_2$ may be between 5 minutes and 6 hours, preferably between 30 minutes and 3 hours. For higher molecular weights, longer polymerization times are absolutely necessary.

Through appropriate choice of the metering time $t_1$ and of the subsequent polymerization time $t_2$ it is possible to bring about targeted adjustment of the minimum molecular weight and of the breadth of the molecular weight distribution of the A blocks. The rapid commencement of metering following primary initiation ensures, furthermore, that polymer blocks A are obtained which have a monomodal molecular weight distribution.

In this way, macroinitiators of the composition A are formed for the sequential construction of block copolymers of the composition AB. These macroinitiators inherently have a molecular weight distribution with a polydispersity index of between 1.8 and 3.0, preferably between 1.9 and 2.5. Following the polymerization time $t_2$, finally, the monomer mixture B is added. The polymerization time $t_2$ is at least a further 60 min, preferably at least 90 min. As a result of the nature of ATRP, at this point in time there are both of the previously initiated polymer species of the composition A available for the polymerization, and the polymer blocks B are constructed under the known preconditions for ATRP. These segments of the polymer chains correspondingly exhibit inherently a narrow molecular weight distribution.

A further advantage of the present invention is the prevention of recombination. With this process, therefore, the formation of particularly high molecular weights can also be prevented. Such polymer constituents would make a more-than-proportionate contribution to increasing the solution viscosity or melt viscosity. Instead, the broad-distribution, monomodal polymer prepared in accordance with the invention has an innovative polymer distribution. As a result of the inclusion of part of the initiator in the initial charge, for primary initiation, the chains are formed which are subject to the longest polymerization time and hence have the highest molecular weight in the end product. Consequently a polymer is obtained which at high molecular weights still has the characteristics of a polymer prepared by means of controlled polymerization. At low molecular weights, however, the distribution exhibits a sharp broadening of the molecular weight distribution, which is similar to that, or even broader than, the distribution of a product prepared by means of conventional free radical polymerization. The overall molecular weight distribution of the polymers prepared in accordance with the invention has a polydispersity index of greater than 1.8.

In accordance with the invention, as a measure of the nonuniformity of the molecular weight distribution, the polydispersity index is reported, as a ratio of the weight average to the number average of the molecular weights. The molecular weights are determined by means of gel permeation chromatography (GPC) against a PMMA standard.

A further embodiment of the present invention is the targeted functionalization of the A and/or the B blocks in AB block copolymers with broad, monomodal molecular weight distribution. The problem has been solved by the preparation of block copolymers having at least 1 and not more than 4 functional groups in the individual A and/or B blocks, in that monomer mixture A and/or monomer mixture B are/is composed of a composition comprising functionalized (meth) acrylates and monomers selected from the group of (meth) acrylates or mixtures thereof which have no additional functional group. In this context it is possible to prepare AB diblock copolymers with functional groups which have different functional groups either only in the A blocks or only in the B blocks, or in both blocks, or have identical functional groups in both blocks.

It has been found more particularly that, among others, block copolymers of the invention can be prepared that have at least 1 and not more than 2 functional groups in an individual block A and/or B.

Said functional groups present in one of the blocks are restricted only in the selection of monomers which can be copolymerized by means of ATRP. The listing below serves only as an example for illustrating the invention, and is not such as to confine the invention in any way whatsoever.

Thus the A and/or B blocks may have OH groups. Hydroxy-functionalized (meth)acrylates suitable for this purpose are preferably hydroxyalkyl(meth)acrylates of straight-chain, branched or cycloaliphatic diols having 2-36 C atoms, such as, for example, 3-hydroxypropyl(meth)acrylate, 3,4-dihydroxybutyl mono(meth)acrylate, 2-hydroxyethyl(meth) acrylate, 4-hydroxybutyl(meth)acrylate, 2-hydroxypropyl (meth)acrylate, 2,5-dimethyl-1,6-hexanediol mono(meth) acrylate, more preferably 2-hydroxyethyl methacrylate.

Amine groups are preparable, for example, through the copolymerization of 2-dimethylaminoethyl methacrylate (DMAEMA), 2-diethylaminoethyl methacrylate (DEAEMA), 2-tert-butylaminoethyl methacrylate (t-BAEMA), 2-dimethylaminoethyl acrylate (DMAEA), 2-diethylaminoethyl acrylate (DEAEA), 2-tert-butylaminoethyl acrylate (t-BAEA), 3-dimethylaminopropylmethacrylamide (DMAPMA) and 3-dimethylaminopropylacrylamide (DMAPA).

Polymers with allyl groups may be realized, for example, through the copolymerization of allyl(meth)acrylate. Polymers with epoxy groups through the copolymerization of glycidyl(meth)acrylate. Acid groups may be realized through the copolymerization of tert-butyl(meth)acrylate with subsequent hydrolysis and/or thermal elimination of isobutene.

Examples of (meth)acrylate-bound silyl radicals that may be recited include —$SiCl_3$, —$SiMeCl_2$, —$SiMe_2Cl$, —$Si(OMe)_3$, —$SiMe(OMe)_2$, —$SiMe_2(OMe)$, —$Si(OPh)_3$, —$SiMe(OPh)_2$, —$SiMe_2(OPh)$, —$Si(OEt)_3$, —$SiMe(OEt)_2$, —$SiMe_2(OEt)$, —$Si(OPr)_3$, —$SiMe(OPr)_2$, —$SiMe_2(OPr)$, —$SiEt(OMe)_2$, —$SiEtMe(OMe)$, —$SiEt_2(OMe)$, —$SiPh(OMe)_2$, —$SiPhMe(OMe)$, —$SiPh_2(OMe)$, —$SiMe(OC(O)Me)_2$, —$SiMe_2(OC(O)Me)$, —$SiMe(O-N=CMe_2)_2$ or —$SiMe_2(O-N=CMe_2)$. Where the abbreviations are as follows: Me stands for methyl-, Ph for phenyl-, Et for ethyl-, and Pr for isopropyl- or n-propyl-. An example of a commercially available monomer is Dynasylan® MEMO from Evonik-Degussa GmbH. This compound is 3-methacryloyloxypropyltrimethoxysilane.

It is advantageous that the monomers used for functionalization are polymerized without crosslinking reactions occurring.

The (meth)acrylate notation stands for the esters of (meth) acrylic acid and here denotes not only methacrylate, such as methyl methacrylate, ethyl methacrylate, etc., for example, but also acrylate, such as methyl acrylate, ethyl acrylate, etc., for example, and also mixtures of both.

Monomers without further functionality which are polymerized both in block A and in block B are selected from the group of (meth)acrylates such as, for example, alkyl(meth) acrylates of straight-chain, branched or cycloaliphatic alcohols having 1 to 40 C atoms, such as, for example, methyl (meth)acrylate, ethyl(meth)acrylate, n-butyl(meth)acrylate, isobutyl(meth)acrylate, tert-butyl(meth)acrylate, pentyl (meth)acrylate, 2-ethylhexyl(meth)acrylate, stearyl(meth) acrylate, lauryl(meth)acrylate, cyclohexyl(meth)acrylate, isobornyl(meth)acrylate; aryl(meth)acrylates such as, for example, benzyl(meth)acrylate or phenyl(meth)acrylate which may in each case have unsubstituted or mono- to tetra-substituted aryl radicals; other aromatically substituted (meth)acrylates such as, for example, naphthyl(meth)acrylate; mono(meth)acrylates of ethers, polyethylene glycols, polypropylene glycols or mixtures thereof having 5-80 C atoms, such as, for example, tetrahydrofurfuryl methacrylate, methoxy(m)ethoxyethyl methacrylate, 1-butoxypropyl methacrylate, cyclohexyloxymethyl methacrylate, benzyloxymethyl methacrylate, furfuryl methacrylate, 2-butoxyethyl methacrylate, 2-ethoxyethyl methacrylate, allyloxymethyl methacrylate, 1-ethoxybutyl methacrylate, 1-ethoxyethyl methacrylate, ethoxymethyl methacrylate, poly(ethylene glycol) methyl ether(meth)acrylate and poly (propylene glycol) methyl ether(meth)acrylate.

Besides the (meth)acrylates set out above it is possible for the compositions to be polymerized also to contain further unsaturated monomers which are copolymerizable with the aforementioned (meth)acrylates and by means of ATRP. These include, among others, 1-alkenes, such as 1-hexene, 1-heptene, branched alkenes such as, for example, vinylcyclohexane, 3,3-dimethyl-1-propene, 3-methyl-1-diisobutylene, 4-methyl-1-pentene, acrylonitrile, vinyl esters such as vinyl acetate, styrene, substituted styrenes with an alkyl substituent on the vinyl group, such as α-methylstyrene and α-ethylstyrene, substituted styrenes with one or more alkyl substituents on the ring such as vinyltoluene and p-methylstyrene, halogenated styrenes such as, for example, monochlorostyrenes, dichlorostyrenes, tribromostyrenes and tetrabromostyrenes; heterocyclic compounds such as 2-vinylpyridine, 3-vinylpyridine, 2-methyl-5-vinylpyridine, 3-ethyl-4-vinylpyridine, 2,3-dimethyl-5-vinylpyridine, vinylpyrimidine, 9-vinylcarbazole, 3-vinylcarbazole, 4-vinylcarbazole, 2-methyl-1-vinylimidazole, vinyloxolane, vinylfuran, vinylthiophene, vinylthiolane, vinylthiazoles, vinyloxazoles and isoprenyl ethers; maleic acid derivatives, such as, for example, maleic anhydride, maleimide, methylmaleimide and dienes such as divinylbenzene, for example, and also, in the A blocks, the respective hydroxy-functionalized and/or amino-functionalized and/or mercapto-functionalized compounds. Furthermore, these copolymers may also be prepared such that they have a hydroxyl and/or amino and/or mercapto functionality in one substituent. Examples of such monomers include vinylpiperidine, 1-vinylimidazole, N-vinylpyrrolidone, 2-vinylpyrrolidone, N-vinylpyrrolidine, 3-vinylpyrrolidine, N-vinylcaprolactam, N-vinylbutyrolactam, hydrogenated vinylthiazoles and hydrogenated vinyloxazoles. Particular preference is given to copolymerizing vinyl esters, vinyl ethers, fumarates, maleates, styrenes or acrylonitriles with the A blocks and/or B blocks. Both the copolymers of block A and the copolymers of block B can have added to them 0-50% by weight of ATRP-polymerized monomers which do not belong to the group of the (meth)acrylates.

The process can be carried out in any desired halogen-free solvents. Preference is given to toluene, xylene, $H_2O$; acetates, preferably butyl acetate, ethyl acetate, propyl acetate; ketones, preferably ethyl methyl ketone, acetone; ethers; aliphatics, preferably pentane, hexane; biodiesel; but also plasticizers such as low-molecular-mass polypropylene glycols or phthalates.

The block copolymers of the composition ABA are prepared by means of sequential polymerization.

Besides solution polymerization the ATRP can also be carried out as emulsion, miniemulsion, microemulsion, suspension or bulk polymerization.

The polymerization can be carried out under atmospheric, subatmospheric or superatmospheric pressure. The temperature of polymerization is also not critical. In general, however, it is situated in the range from −20° C. to 200° C., preferably from 0° C. to 130° C. and with particular preference from 50° C. to 120° C.

The polymer of the invention preferably has a number-average molecular weight of between 5000 g/mol and 100 000 g/mol, with particular preference between 7500 g/mol and 50 000 g/mol.

As monofunctional initiator it is possible to use any compound which has an atom or group of atoms which can be transferred free-radically under the polymerization conditions of the ATRP process. Suitable initiators encompass in generalized terms, the following formulae: $R^1R^2R^3C$—X, $R^1C(=O)$—X, $R^1R^2R^3Si$—X, $R^1R^2N$—X and $(R^1)(R^2O)P(O)_m$—X, where X is selected from the group consisting of Cl, Br, I, $OR^4$, $SR^4$, $SeR^4$, $OC(=O)R^4$, $OP(=O)R^4$, $OP(=O)(OR^4)_2$, $OP(=O)OR^4$, O—$N(=R^4)_2$, CN, NC, SCN, NCS, OCN, CNO and $N_3$ (where $R^4$ is an alkyl group having 1 to 20 carbon atoms, it being possible for each hydrogen atom independently to be replaced by a halogen atom, preferably fluoride or chloride, or is alkenyl having 2 to 20 carbon atoms, preferably vinyl, alkenyl having 2 to 10 carbon atoms, preferably acetylenyl, phenyl which may be substituted by 1 to 5 halogen atoms or alkyl groups having 1 to 4 carbon atoms, or is aralkyl, and where $R^1$, $R^2$ and $R^3$ independently of one another are selected from the group consisting of hydrogen, halogen, alkyl groups having 1 to 20, preferably 1 to 10 and more preferably 1 to 6 carbon atoms, cycloalkyl groups having 3 to 8 carbon atoms, silyl groups, alkylsilyl groups, alkoxysilyl groups, amine groups, amide groups, COCl, OH, CN, alkenyl or alkynyl groups having 2 to 20 carbon atoms, preferably 2 to 6 carbon atoms and more preferably allyl or vinyl, oxiranyl, glycidyl, alkenyl or alkenyl groups having 2 to 6 carbon atoms, which are substituted by oxiranyl or glycidyl, aryl, heterocyclyl, aralkyl, aralklenyl (aryl-substituted alkenyl, aryl being defined as above and alkenyl being vinyl which with one or two $C_1$ to $C_6$ alkyl groups, in which one to all of the hydrogen atoms, preferably one, are substituted by halogen (preferably fluorine or chlorine if one or more hydrogen atoms are replaced, and preferably fluorine, bromine or bromine if one hydrogen atom is replaced) alkenyl groups having 1 to 6 carbon atoms which are substituted by 1 to 3 substituents (preferably 1) selected from the group consisting of $C_1$ to $C_4$ alkoxy, aryl, heterocyclyl, cetyl, acetyl, amine, amide, oxiranyl and glycidyl, and m=0 or 1; m=0, 1 or 2. Preferably not more than two of the radicals $R^1$, $R^2$ and $R^3$ are hydrogen, and more preferably not more than one of the radicals $R^1$, $R^2$ and $R^3$ is hydrogen.

The particularly preferred initiators include benzyl halides, such as p-chloromethylstryene, hexakis(α-bromomethyl) benzene, benzyl chloride, benzyl bromide, 1-bromo-1-phenylethane and 1-chloro-1-phenylethane. Additionally particularly preferred are carboxylic acid derivatives which are halogenated in the α-position, such as, for example, propyl 2-bromopropionate, methyl 2-chloropropionate, ethyl 2-chloropropionate, methyl 2-bromopropionate or ethyl 2-bromoisobutyrate. Also preferred are tosyl halides, such as p-toluenesulfonyl chloride; alkyl halides, such as 1-vinylethyl chloride or 1-vinylethyl bromide; and halogen derivatives of phosphoric esters, such as demethylphosphonyl chloride.

Catalysts for ATRP are set out in Chem. Rev. 2001, 101, 2921. The description is predominantly of copper complexes—among others, however, compounds of iron, of rhodium, of platinum, of ruthenium or of nickel are employed. In general it is possible to use any transition metal compounds which, with the initiator, or with the polymer chain which has a transferable atomic group, are able to form a redox cycle. Copper can be supplied to the system for this purpose, for example, starting from $Cu_2O$, CuBr, CuCl, CuI, $CuN_3$, CuSCN, CuCN, $CuNO_2$, $CuNO_3$, $CuBF_4$, Cu $(CH_3COO)$ or Cu $(CF_3COO)$.

One alternative to the ATRP described is represented by a variant of it: In so-called reverse ATRP, compounds in higher oxidation states can be used, such as $CuBr_2$, $CuCl_2$, CuO, $CrCl_3$, $Fe_2O_3$ or $FeBr_3$, for example. In these cases the reaction can be initiated by means of conventional free-radical initiators such as, for example, AIBN. In this case the transition metal compounds are first reduced, since they are reacted with the radicals generated from the conventional free-radical initiators. Reverse ATRP has been described by, among others, Wang and Matyjaszewski in Macromolecules (1995), vol. 28, p. 7572 ff.

One variant of reverse ATRP is represented by the additional use of metals in the zero oxidation state. As a result of an assumed comproportionation with the transition metal compounds in the higher oxidation state, an acceleration is brought about in the reaction rate. This process is described in more detail in WO 98/40415.

The molar ratio of transition metal to initiator is generally situated in the range from 0.02:1 to 20:1, preferably in the range from 0.02:1 to 6:1 and with particular preference in the range from 0.2:1 to 4:1, without any intention hereby to impose any restriction.

In order to increase the solubility of the metals in organic solvents and at the same time to prevent the formation of stable and hence polymerization-inert organometallic compounds, ligands are added to the system. Additionally, the ligands facilitate the abstraction of the transferable atomic group by the transition metal compound. A listing of known ligands is found for example in WO 97/18247, WO 97/47661 or WO 98/40415. As a coordinative constituent, the compounds used as ligand usually contain one or more nitrogen, oxygen, phosphorus and/or sulfur atoms. Particular preference is given in this context to nitrogen-containing compounds. Very particular preference is enjoyed by nitrogen-containing chelate ligands. Examples that may be given include 2,2'-bipyridine, N,N,N',N'',N''-pentamethyldiethylenetriamine (PMDETA), tris(2-aminoethyl)amine (TREN), N,N,N',N'-tetramethylethylenediamine or 1,1,4,7,10,10-hexamethyltriethylenetetramine. Valuable indicators relating to the selection and combination of the individual components are found by the skilled person in WO 98/40415.

These ligands may form coordination compounds in situ with the metal compounds or they may first be prepared as coordination compounds and then introduced into the reaction mixture.

The ratio of ligand (L) to transition metal is dependent on the denticity of the ligand and on the coordination number of the transition metal (M). In general the molar ratio is situated in the range 100:1 to 0.1:1, preferably 6:1 to 0.1:1 and with particular preference 3:1 to 1:1, without any intention hereby to impose any restriction.

When ATRP has taken place, the transition metal compound can be precipitated by the addition of a suitable sulfur compound. By addition of mercaptans, for example, the halogen atom at the end of the chain is substituted, with release of a hydrogen halide. The hydrogen halide—HBr, for example—protonates the ligand L, coordinated on the transition metal, to form an ammonium halide. As a result of this process, the transition metal-ligand complex is quenched and the "bare" metal is precipitated. After that the polymer solution can easily be purified by means of a simple filtration. The said sulfur compounds are preferably compounds containing an SH group. With very particular preference they are one of the chain transfer agents known from free-radical polymerization, such as ethylhexylmercaptan or n-dodecylmercaptan.

A broad field of application is produced for these products. The selection of the use examples is not such as to restrict the use of the polymers of the invention. Diblock copolymers of the composition AB with reactive groups may be used preferably as prepolymers for a moisture-curing crosslinking. These prepolymers can be crosslinked with any desired polymers.

The preferred applications for the diblock copolymers of the invention of the composition AB having less than four functional groups in the individual A blocks with, for example, silyl groups are to be found in sealants, in reactive hotmelt adhesives or in adhesive bonding compositions. Particularly appropriate uses are in sealants for applications in the fields of automotive engineering, shipbuilding, container construction, mechanical engineering and aircraft engineering, and also in the electrical industry and in the building of domestic appliances. Further preferred fields of application are those of sealants for building applications, heat-sealing applications or assembly adhesives.

The possible applications for materials produced in accordance with the invention do not, however, include only binders for sealants or intermediates for the introduction of other kinds of functionalities. EP 1 510 550, for example, describes a coating composition whose constituents include acrylate particles and polyurethanes. A polymer of the invention in a corresponding formulation would result in an improvement in the processing properties and crosslinking properties. Conceivable applications are, for example, powder coating formulations.

With the new binders it is possible to prepare crosslinkable one-component and two-component elastomers for example for one of the recited applications. Typical further ingredients of a formulation are the binder, solvents, fillers, pigments, plasticizers, stabilizing additives, water scavengers, adhesion promoters, thixotropic agents, crosslinking catalysts, tackifiers, etc.

In order to reduce the viscosity it is possible to use solvents, examples being aromatic hydrocarbons such as toluene, xylene, etc., esters such as ethyl acetate, butyl acetate, amyl acetate, Cellosolve acetate, etc., ketones such as methyl ethyl ketone, methyl isobutyl ketone, diisobutyl ketone, etc. The solvent may be added as early as during the radical polymerization.

Crosslinking catalysts for hydrosilylated binders in a formulation for example with corresponding polyurethanes are the common organic tin, lead, mercury and bismuth catalysts, examples being dibutyltin dilaurate (e.g. from BNT Chemicals GmbH), dibutyltin diacetate, dibutyltin diketonate (e.g. Metatin 740 from Acima/Rohm+Haas), dibutyltin dimaleate, tin naphthenate, etc. It is also possible to use reaction products of organic tin compounds, such as dibutyltin dilaurate, with silicic esters (e.g. DYNASIL A and 40), as crosslinking catalysts. Also, in addition, titanates (e.g. tetrabutyl titanate, tetrapropyl titanate, etc.), zirconates (e.g. tetrabutyl zirconate, etc.), amines (e.g. butylamine, diethanolamine, octylamine, morpholine, 1,3-diazabicyclo[5.4.6]undec-7-ene (DBU), etc.) and/or their carboxylic salts, low molecular mass polyamides, amino organosilanes, sulfonic acid derivatives, and mixtures thereof.

One advantage of the block copolymers is the colorlessness and also the odorlessness of the product produced.

A further advantage of the present invention is in addition the restricted number of functionalities in the respective functionalized polymer blocks. A higher fraction of functional groups in the binder results in possible premature gelling or at least in an additional increase in the solution viscosity and melt viscosity.

The examples given below are given for the purpose of improved illustration of the present invention, but are not apt to restrict the invention to the features disclosed herein.

EXAMPLES

The number-average and weight-average molecular weights Mn and Mw and the polydispersity index D=Mw/Mn as a measure of the molecular weight distributions are determined by means of gel permeation chromatography (GPC) in tetrahydrofuran relative to a PMMA standard.

Example 1

A Schlenk flask equipped with magnetic stirrer, thermometer, reflux condenser and dropping funnel was charged under an $N_2$ atmosphere with monomer 1a (precise name and quantity in table 1), 90 ml of propyl acetate, copper(I) oxide (for amount see table 1) and N,N,N',N'',N'''-pentamethyldiethylenetriamine (PMDETA, for amount see table 1). The solution is stirred at 80° C. for 15 minutes. Subsequently, at the same temperature, an amount of an initiator 1 (see table 1), ethyl 2-bromoisobutyrate (EBIB, in 5 ml of propyl acetate) is added. After two minutes, the uniform metered addition of the amount of the initiator 2 (see table 1), ethyl 2-bromoisobutyrate (EBIB, in 5 ml of propyl acetate) is commenced. Metering proceeds without interruption and with a constant metering rate over the time period $t_1$. Following complete addition of initiator, the polymerization solution is stirred at the polymerization temperature for a time period $t_2$, before a sample is taken for determination of the average molar weight $M_n$ (by means of SEC) and monomer 2a (for precise amount see table 1) is added. The mixture is stirred at 80° C. for two hours more and then terminated by addition of 1.5 g of mercaptoethanol. The solution is worked up by filtration over silica gel and the subsequent removal of volatile constituents by means of distillation. The average molecular weight is determined, finally, by SEC measurements.

Example 2

A Schlenk flask equipped with magnetic stirrer, thermometer, reflux condenser and dropping funnel was charged under an $N_2$ atmosphere with monomer 1b (precise name and quantity in table 1), 90 ml of propyl acetate, copper(I) oxide (for amount see table 1) and N,N,N',N'',N''-pentamethyldiethylenetriamine (PMDETA, for amount see table 1). The solution is stirred at 80° C. for 15 minutes. Subsequently, at the same temperature, an amount of an initiator 1 (see table 1), ethyl 2-bromoisobutyrate (EBIB, in 5 ml of propyl acetate) is added. Directly afterwards, the uniform metered addition of the amount of the initiator 2 (see table 1), ethyl 2-bromoisobutyrate) (EBIB, in 5 ml of propyl acetate) is commenced. Metering proceeds without interruption and with a constant metering rate over the time period $t_1$. Following complete addition of initiator, the polymerization solution is stirred at the polymerization temperature for a time period $t_2$, before a sample is taken for determination of the average molar weight $M_n$ (by means of SEC) and monomer 2b (for precise name and amount see table 1) is added. The mixture is stirred at 80° C. for three hours more and then terminated by addition of 0.8 g of n-dodecyl mercaptan. The solution is worked up by filtration over silica gel and the subsequent removal of volatile constituents by means of distillation. The average molecular weight is determined, finally, by SEC measurements.

Example 3

In the same way as for example 1, the monomers 1d, 2d and 3d (precise name and quantity in table 1) are used.

Example 4

In the same way as for example 1, the monomer 1e, 2e and 3e (precise name and amount in table 1) are used.

TABLE 1

| Example | 1 | 2 | 3 | 4 |
|---|---|---|---|---|
| Monomer 1 | 1a) n-BA | 1b) n-BA | 1d) n-BA | 1e) n-BA |
| Amount | 85 g | 85 g | 85 g | 85 g |
| Copper(I) oxide | 0.35 g | 0.18 g | 0.35 g | 0.35 g |
| PMDETA | 0.87 g | 0.45 g | 0.90 g | 0.87 g |
| Initiator 1 | 0.25 g | 0.12 g | 0.25 g | 0.25 g |
| Initiator 2 | 1.75 g | 0.90 g | 1.75 g | 1.75 g |
| $t_1$ | 120 min | 120 min | 180 min | 180 min |
| $t_2$ | 120 min | 180 min | 90 min | 90 min |
| Monomer 2 | 2a) MMA | 2b) MMA | 2d) MMA | 2e) n-BA |
| Amount | 10 g | 15 g | 10 g | 10 g |
| Monomer 3 | 3a) MEMO | — | 3d) AMA | 3e) HEMA |
| Amount | 5.0 g | — | 5.0 g | 5.0 g |
| $M_n$ (stage 1) | 25 700 | 57 200 | 28 000 | 28 800 |
| D | 1.94 | 2.07 | 1.99 | 2.01 |
| $M_n$ (end product) | 31 200 | 64 000 | 32 500 | 33 700 |
| D | 1.92 | 1.87 | 1.93 | 1.96 |

MMA = methyl methacrylate;
n-BA = n-butyl acrylate,
MEMO = Dynasylan MEMO (3-methacryloxypropyltrimethoxy-silane),
AMA = allyl methacrylate,
HEMA = 2-hydroxy-ethyl methacrylate The molecular weight distributions of the first polymerization stages are in each case monomodal having a widening of the molecular weight distribution in the direction of small molecular weights and have a molecularity index D of greater than 1.8. The end products have correspondingly large molecularity indices, albeit smaller than those of the pure A blocks. This effect is a result of the higher molecular weight overall, but also shows that the polymerization of the B blocks is controlled and that the blocks per se have a narrow molecular weight distribution.

Following removal of the solvent, the silyl-functionalized products can be stabilized by addition of suitable drying agents. This ensures a good shelflife without further increase in molecular weight.

Comparative Example 1

A Schlenk flask equipped with magnetic stirrer, thermometer, reflux condenser and dropping funnel was charged under an $N_2$ atmosphere with monomer 1f (precise name and quantity in table 2), 90 ml of propyl acetate, 0.48 g of copper(I) oxide and 1.1 g of N,N,N',N'',N''-pentamethyldiethylenetriamine (PMDETA). The solution is stirred at 80° C. for 15 minutes. Subsequently, at the same temperature, ethyl 2-bromoisobutyrate initiator (EBIB, in 5 ml of propyl acetate; for amount see table 2) dissolved in 5 ml of propyl acetate is added. After the polymerization time of three hours a sample is taken for determination of the average molar weight $M_n$ (by means of SEC) and a mixture of monomer 2f and monomer 3f (for precise name and amount see table 2) is added. The mixture is polymerized to an anticipated conversion of at least 95% and is terminated by addition of 1.5 g of n-dodecyl mercaptan. The solution is worked up by filtration over silica gel and the subsequent removal of volatile constituents by means of distillation. The average molecular weight is determined, finally, by SEC measurements.

Comparative Example 2

In the same way as for comparative example 1, the monomers 1g, 2g and 3g (precise name and amount in table 2) are used.

Comparative Example 3

A Schlenk flask equipped with magnetic stirrer, thermometer, reflux condenser and dropping funnel was charged under an $N_2$ atmosphere with monomer 1f (precise name and quantity in table 2), 100 ml of propyl acetate, 0.29 g of copper(I) oxide and 0.69 g of N,N,N',N'',N''-pentamethyldiethylenetriamine (PMDETA). The solution is stirred at 80° C. for 15 minutes. Subsequently, at the same temperature, ethyl 2-bromoisobutyrate initiator (EBIB, in 5 ml of propyl acetate; for amount see table 2) dissolved in 5 ml of propyl acetate is added. After the polymerization time of three hours a sample is taken for determination of the average molar weight $M_n$ (by means of SEC) and a mixture of monomer 2f and monomer 3f (for precise name and amount see table 2) is added. The mixture is polymerized to an anticipated conversion of at least 95% and is terminated by addition of 1.0 g of n-dodecyl mercaptan. The solution is worked up by filtration over silica gel and the subsequent removal of volatile constituents by means of distillation. The average molecular weight is determined, finally, by SEC measurements.

TABLE 2

| Comparative example | 1 | 2 | 3 |
|---|---|---|---|
| Monomer 1 | 1f) n-BA | 1g) n-BA | 1h) n-BA |
| Amount | 90 g | 90 g | 93 g |
| Monomer 2 | 2f) MMA | 2g) MMA | 2h) MMA |
| Amount | 5 g | 5 g | 7 g |
| Monomer 3 | 3f) HEMA | 3g) MEMO | — |
| Amount | 5.0 g | 4.8 g | — |
| Initiator amount | 0.65 g | 0.65 g | 0.39 g |
| $M_n$ (Stage 1) | 25 900 | 25 700 | 36 500 |
| D | 1.42 | 1.31 | 1.31 |
| $M_n$ (end product) | 27 800 | 32 600 | 39 400 |
| D | 1.45 | 1.49 | 1.29 |

The comparative examples show that with conventional addition of initiator in one batch, polymers are formed that have relatively narrowly distributed inner blocks and molecularity indices of less than 1.5.

The invention claimed is:

1. A process for preparing a block copolymer by a sequentially implemented atom transfer radical polymerization (ATRP), the processing comprising:
   (A) adding a monofunctional initiator for initiating the reaction to a polymerization solution in a first portion; and, thereafter;
   (B) continuously adding a second portion of the monofunctional initiator, to obtain the block copolymer;
   wherein the block copolymer, which has an AB composition, has an overall molecular weight distribution with a polydispersity index of greater than 1.8,
   wherein block A is a copolymer having a monomodal molecular weight distribution with a polydispersity index of greater than 1.8, and comprises at least one (meth)acrylate, and
   wherein block B is a copolymer having a monomodal molecular weight distribution comprising at least one (meth)acrylate, and
   wherein the block copolymer has an overall polydispersity index of greater than 1.8.

2. The process of claim 1, wherein the first portion of the initiator accounts for 10% to 60% of an overall amount of initiator and is added batchwise at a start of the polymerization, and
   wherein the second portion of the initiator is metered in directly after addition of the first initiator batch to the system, with a constant metering rate.

3. The process of claim 2, wherein the continuous adding of the second portion of the monofunctional initiator is carried out over a period of at least 30 minutes, and the continuous adding is ended at least 60 minutes before addition of a monomer mixture B to the polymerization solution.

4. The process of claim 2, wherein
   the continuous adding of the second portion of the monofunctional initiator is carried out over a period of at least 60 minutes, and the continuous adding is ended at least 90 minutes before addition of a monomer mixture B to the polymerization solution.

5. The process of claim 1, wherein block A or block B of the block copolymer has a composition with at least 1 and not more than 4 functional groups.

6. The process of claim 5, wherein at least one monomer which comprises:
   an unsaturated, free-radically polymerizable group; and
   a second functional group selected from the group consisting of hydroxyl, an amine group, an allyl group, a silyl group, and an epoxy group,
   is copolymerized into at least one of the block A and the block B.

7. The process of claim 1, wherein
   block A, block B, or block A and B of the block copolymer comprises at least 1 and not more than 4 functional groups, where the functional groups in block A, block B, or blocks A and B are identical.

8. The process of claim 1, wherein at least one selected from the group consisting of the block A and the block B additionally comprises at least one monomer selected from the group consisting of a vinyl ester, a vinyl ether, a fumarate, a maleate, a styrene, an acrylonitrile, and a further monomer polymerizable by ATRP.

9. The process of claim 1, wherein the block copolymer has a number-average molecular weight of between 5000 g/mol and 100 000 g/mol.

10. The process of claim 1, further comprising, after the polymerization, precipitating an ATRP catalyst by addition of a mercaptan or a compound having a thiol group, and removing the catalyst from the polymerization solution by filtration.

11. The process of claim 1, wherein the first portion of the initiator accounts for 20% to 40% of an overall amount of initiator and is added batchwise at a start of the polymerization, and
   wherein the second portion of the initiator is metered in directly after addition of the first initiator batch to the system, with a constant metering rate.

12. The process of claim 1, wherein block A or block B of the block copolymer has a composition with at least 1 and not more than 2 functional groups.

13. The process of claim 1, wherein
   block A, block B, or block A and B of the block copolymer comprises at least 1 and not more than 4 functional groups, where the functional groups in block A, block B, or blocks A and B are different.

14. The process of claim 1, wherein
   block A, block B, or block A and B of the block copolymer comprises at least 1 and not more than 2 functional groups, where the functional groups in block A, block B, or blocks A and B are identical.

15. The process of claim 1, wherein
   block A, block B, or block A and B of the block copolymer comprises at least 1 and not more than 2 functional groups, where the functional groups in block A, block B, or blocks A and B are different.

16. An AB diblock copolymer, comprising:
   block B, having a monomodal molecular weight distribution; and
   block A, having a broad, monomodal molecular weight distribution with a polydispersity index of greater than 1.8,
   wherein a polydispersity index of the AB diblock copolymer is greater than 1.8, but less than that of block A,
   wherein the AB diblock copolymer comprises at least one (meth)acrylate, and wherein the AB diblock copolymer is obtained by the process of claim 15.

17. A hotmelt adhesive, a fluid adhesive, a pressure-sensitive adhesive, an elastic sealant, a coating material, or a foam precursor, comprising the copolymer of claim 16.

18. A heat-sealing composition, comprising the copolymer of claim 16.

19. A crosslinkable composition, comprising the copolymer of claim 16, wherein the copolymer has at least one reactive functional group.

* * * * *